(12) United States Patent
Kim et al.

(10) Patent No.: US 11,724,612 B2
(45) Date of Patent: Aug. 15, 2023

(54) BIDIRECTIONAL CHARGING SYSTEM FOR VEHICLE

(71) Applicants: Hyundai Motor Company, Seoul (KR); Kia Corporation, Seoul (KR)

(72) Inventors: Jae Hyun Kim, Incheon (KR); Hyun-Wook Seong, Hwaseong-si (KR); Dong Gyun Woo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/830,543

(22) Filed: Jun. 2, 2022

(65) Prior Publication Data
US 2023/0011289 A1 Jan. 12, 2023

(30) Foreign Application Priority Data
Jul. 9, 2021 (KR) .................... 10-2021-0090346

(51) Int. Cl.
*B60L 53/60* (2019.01)
*B60L 53/24* (2019.01)
(Continued)

(52) U.S. Cl.
CPC ............ *B60L 53/24* (2019.02); *B60L 50/60* (2019.02); *H02J 3/322* (2020.01); *H02J 7/0068* (2013.01);
(Continued)

(58) Field of Classification Search
CPC ........ B60L 53/24; B60L 50/60; H02M 7/797; H02M 3/335; H02M 1/42; H02J 7/00; H02J 3/32
See application file for complete search history.

(56) References Cited

U.S. PATENT DOCUMENTS

2012/0112702 A1* 5/2012 Steigerwald ............ B60L 7/14
320/137
2013/0328527 A1 12/2013 Kang
(Continued)

FOREIGN PATENT DOCUMENTS

KR 20130138954 A 12/2013
KR 20170126053 A 11/2017
KR 20210005754 A 1/2021

*Primary Examiner* — Adi Amrany
*Assistant Examiner* — Esayas G Yeshaw
(74) *Attorney, Agent, or Firm* — Slater Matsil, LLP

(57) ABSTRACT

An embodiment bidirectional charging system for a vehicle includes a first bridge circuit having a plurality of legs each including two first switching elements connected in series with each other between both ends of a battery, a transformer comprising a plurality of primary-side windings connected to a grid or load side and a plurality of secondary-side windings insulated from the plurality of primary-side windings, a motor including a plurality of input terminals configured to receive a plurality of phase voltages, respectively, a plurality of changeover switches configured to selectively connect connection nodes of the two first switching elements included in the plurality of legs to the plurality of secondary-side windings or to the plurality of input terminals, respectively, and a controller configured to control connection states of the plurality of changeover switches according to a pre-configured operation mode.

20 Claims, 2 Drawing Sheets

(51) Int. Cl.
    *H02M 7/797* (2006.01)
    *H02J 7/00* (2006.01)
    *H02J 3/32* (2006.01)
    *H02M 3/335* (2006.01)
    *B60L 50/60* (2019.01)
    *H02M 1/42* (2007.01)
    *H02P 27/06* (2006.01)

(52) U.S. Cl.
    CPC ..... *H02M 1/4208* (2013.01); *H02M 3/33573* (2021.05); *H02M 3/33584* (2013.01); *H02M 7/797* (2013.01); *B60L 2210/30* (2013.01); *H02J 2207/20* (2020.01); *H02J 2310/48* (2020.01); *H02P 27/06* (2013.01)

(56) References Cited

U.S. PATENT DOCUMENTS

| | | | |
|---|---|---|---|
| 2017/0320396 A1 | 11/2017 | Kim et al. | |
| 2018/0278168 A1* | 9/2018 | Brown | H02J 7/0068 |
| 2020/0127581 A1* | 4/2020 | Chen | H02M 7/4826 |
| 2020/0298722 A1* | 9/2020 | Smolenaers | H02J 7/345 |
| 2021/0001738 A1 | 1/2021 | Youn et al. | |
| 2022/0355686 A1* | 11/2022 | Teng | B60L 53/22 |

\* cited by examiner

BIDIRECTIONAL CHARGING SYSTEM FOR VEHICLE

CROSS-REFERENCE TO RELATED APPLICATIONS

This application claims the benefit of Korean Patent Application No. 10-2021-0090346, filed on Jul. 9, 2021, which application is hereby incorporated herein by reference.

TECHNICAL FIELD

The present disclosure relates to a bidirectional charging system for a vehicle.

BACKGROUND

Recent global trends toward carbon dioxide emission reduction have been followed by decreasing demands for typical cars having internal combustion engines, which generate power for traveling through fossil fuel combustion, and increasing demands for electric cars which generate power for traveling by using electric energy stored in energy storage devices (for example, batteries) to drive motors.

An electric car includes a battery configured to store electric energy to be supplied to a motor for generating vehicle traveling power, and a mounted charger for battery charging, which is configured to convert external power into power used to charge the battery.

Meanwhile, recent increases in the capacity of batteries of electric cars have caused demands for development of vehicle-to-grid (V2G) or vehicle-to-load (V2L) technology for supplying energy stored in the vehicle batteries to grids or loads. In addition, there has been research/development regarding torque vectoring technology wherein auxiliary motors are provided on wheels connected to both sides of the driving shaft, and the speed of each driving wheel is individually controlled, thereby securing traveling security.

As such, electric cars need not only a charger for simply charging batteries, but also various circuits for power conversion, such as a circuit for implementing V2G or V2L and a circuit for driving auxiliary motors for torque vectoring.

If a vehicle includes such various power conversion circuits individually, a large number of electric components may be needed to implement individual power conversion circuits. This may cause not only a problem of complicated circuit structure, but also another problem of increased costs for circuit implementation.

The above descriptions regarding background technologies have been made only to help understanding of the background of embodiments of the present disclosure, and are not to be deemed by those skilled in the art to correspond to already-known prior art.

SUMMARY

The present disclosure relates to a bidirectional charging system for a vehicle. Particular embodiments relate to a bidirectional charging system for a vehicle, which can perform power conversion for charging a battery inside the vehicle and power conversion for providing power stored in the battery inside the vehicle to a grid, a load, or a motor provided in the vehicle.

Accordingly, an embodiment of the present disclosure provides a bidirectional charging system for a vehicle, which can implement power conversion for charging a battery inside the vehicle and power conversion for providing power stored in the battery inside the vehicle to a grid, a load, or a motor provided in the vehicle by using a minimum number of electric components.

An embodiment of the present disclosure provides a bidirectional charging system for a vehicle, the system including a first bridge circuit having a plurality of legs each including two first switching elements connected in series with each other between both ends of a battery, a transformer including a plurality of primary-side windings connected to a grid or load side, and a plurality of secondary-side windings insulated from the plurality of primary-side windings, a motor including a plurality of input terminals configured to receive a plurality of phase voltages, respectively, a plurality of changeover switches configured to selectively connect connection nodes of the two first switching elements included in the plurality of legs to the plurality of secondary-side windings or to the plurality of input terminals, respectively, and a controller configured to control connection states of the plurality of changeover switches according to a pre-configured operation mode.

In an embodiment of the present disclosure, in a first operation mode in which the motor is driven while the vehicle is traveling, the controller may control the plurality of changeover switches such that the connection nodes of the first switching elements included in respective legs of the first bridge circuit are electrically connected to the input terminals of the motor.

In an embodiment of the present disclosure, in the first operation mode, the controller controls the first switching elements such that the first bridge circuit operates as an inverter configured to convert a DC voltage of the battery to generate an AC phase voltage provided to the input terminals of the motor.

In an embodiment of the present disclosure, the motor may be an auxiliary driving motor installed on each driving wheel of the vehicle for torque vectoring.

In an embodiment of the present disclosure, in a second operation mode in which the motor is not driven while the vehicle is traveling, the controller may control the plurality of changeover switches such that the connection nodes of the first switching elements included in respective legs of the first bridge circuit are electrically connected to the secondary-side windings of the transformer.

In an embodiment of the present disclosure, in the second operation mode, the controller may control the first switching elements such that a DC voltage of the battery is converted into an AC voltage and the converted AC voltage is provided to the secondary-side windings of the transformer.

In an embodiment of the present disclosure, in a third operation mode in which the battery is charged while the vehicle is stopped and a fourth operation mode in which power is supplied from the battery to an external grid or load while the vehicle is stopped, the controller may control the plurality of changeover switches such that the connection nodes of the first switching elements included in respective legs of the first bridge circuit are electrically connected to the secondary-side windings of the transformer.

In an embodiment of the present disclosure, in the third operation mode and the fourth operation mode, the controller may control the first switching elements such that a DC voltage of the battery is converted into an AC voltage and the converted AC voltage is provided to the secondary-side windings of the transformer.

Another embodiment of the present disclosure provides a bidirectional charging system for a vehicle, the system including a DC-DC converter including a first bridge circuit having a plurality of legs each including two first switching elements connected in series with each other between both ends of a battery, a transformer including a plurality of primary-side windings and a plurality of secondary-side windings insulated from the plurality of primary-side windings, and a second bridge circuit having a plurality of legs each including two second switching elements connected in series with each other, a motor including a plurality of input terminals configured to receive a plurality of phase voltages, respectively, a plurality of changeover switches configured to selectively connect connection nodes of the two first switching elements included in the plurality of legs in the first bridge circuit to the plurality of secondary-side windings or to the plurality of input terminals, respectively, a power factor correction circuit including a plurality of inductors each having a first end connected to a grid/load connection terminal, and a third bridge circuit having a plurality of legs each including two third switching elements connected in series with each other, second ends of the plurality of inductors being connected to connection nodes of the two third switching elements included in the plurality of legs in the third bridge circuit, respectively, a DC capacitor commonly connected between both ends of the legs in the second bridge circuit and both ends of the legs in the third bridge circuit, and a controller configured to control connection states of the plurality of changeover switches according to a pre-configured operation mode.

In an embodiment of the present disclosure, in a first operation mode in which the motor is driven while the vehicle is traveling, the controller may control the plurality of changeover switches such that the connection nodes of the first switching elements included in respective legs of the first bridge circuit are electrically connected to the input terminals of the motor.

In an embodiment of the present disclosure, in the first operation mode, the controller may control the first switching elements such that the first bridge circuit operates as an inverter configured to convert a DC voltage of the battery to generate an AC phase voltage provided to the input terminals of the motor.

In an embodiment of the present disclosure, the motor may be an auxiliary driving motor installed on each driving wheel of the vehicle for torque vectoring.

In an embodiment of the present disclosure, in a second operation mode in which the motor is not driven while the vehicle is traveling, the controller may control the plurality of changeover switches such that the connection nodes of the first switching elements included in respective legs of the first bridge circuit are electrically connected to the secondary-side windings of the transformer.

In an embodiment of the present disclosure, in the second operation mode, the controller may control the first switching elements such that a DC voltage of the battery is converted into an AC voltage and the converted AC voltage is provided to the secondary-side windings of the transformer, control the second switching elements such that AC power of the primary-side windings of the transformer induced by AC power applied to the secondary-side windings of the transformer is converted into DC power, and control the third switching elements such that a DC voltage formed in the DC capacitor through the control of the second switching elements is converted into AC power corresponding to a power source of a load connected to the grid/load connection terminal.

In an embodiment of the present disclosure, in a third operation mode in which the battery is charged while the vehicle is stopped and a fourth operation mode in which power is supplied from the battery to an external grid or load while the vehicle is stopped, the controller may control the plurality of changeover switches such that the connection nodes of the first switching elements included in respective legs of the first bridge circuit are electrically connected to the secondary-side windings of the transformer.

In an embodiment of the present disclosure, in the third operation mode and the fourth operation mode, the controller may control the first switching elements such that a DC voltage of the battery is converted into an AC voltage and the converted AC voltage is provided to the secondary-side windings of the transformer, control the second switching elements such that AC power of the primary-side windings of the transformer induced by AC power applied to the secondary-side windings of the transformer is converted into DC power, and control the third switching elements such that a DC voltage formed in the DC capacitor through the control of the second switching elements is converted into AC power corresponding to a power source of a grid or a load connected to the grid/load connection terminal.

According to the bidirectional charging system for a vehicle, the bridge circuit of the DC-DC converter provided in the charger is used to drive the auxiliary driving motor for torque vectoring, thereby requiring no separate inverter for the auxiliary driving motor. This is advantageous in that, according to the bidirectional charging system for a vehicle, any increase in the circuit size and cost resulting from motor driving circuit addition can be suppressed.

Advantageous effects obtainable from embodiments of the present disclosure are not limited to the above-mentioned advantageous effects, and other advantageous effects not mentioned herein will be clearly understood by those skilled in the art to which the present disclosure pertains.

BRIEF DESCRIPTION OF THE DRAWINGS

The above and other aspects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, a bidirectional charging system for a vehicle according to various embodiments will be described in more detail with reference to the accompanying drawings.

Figure 1:
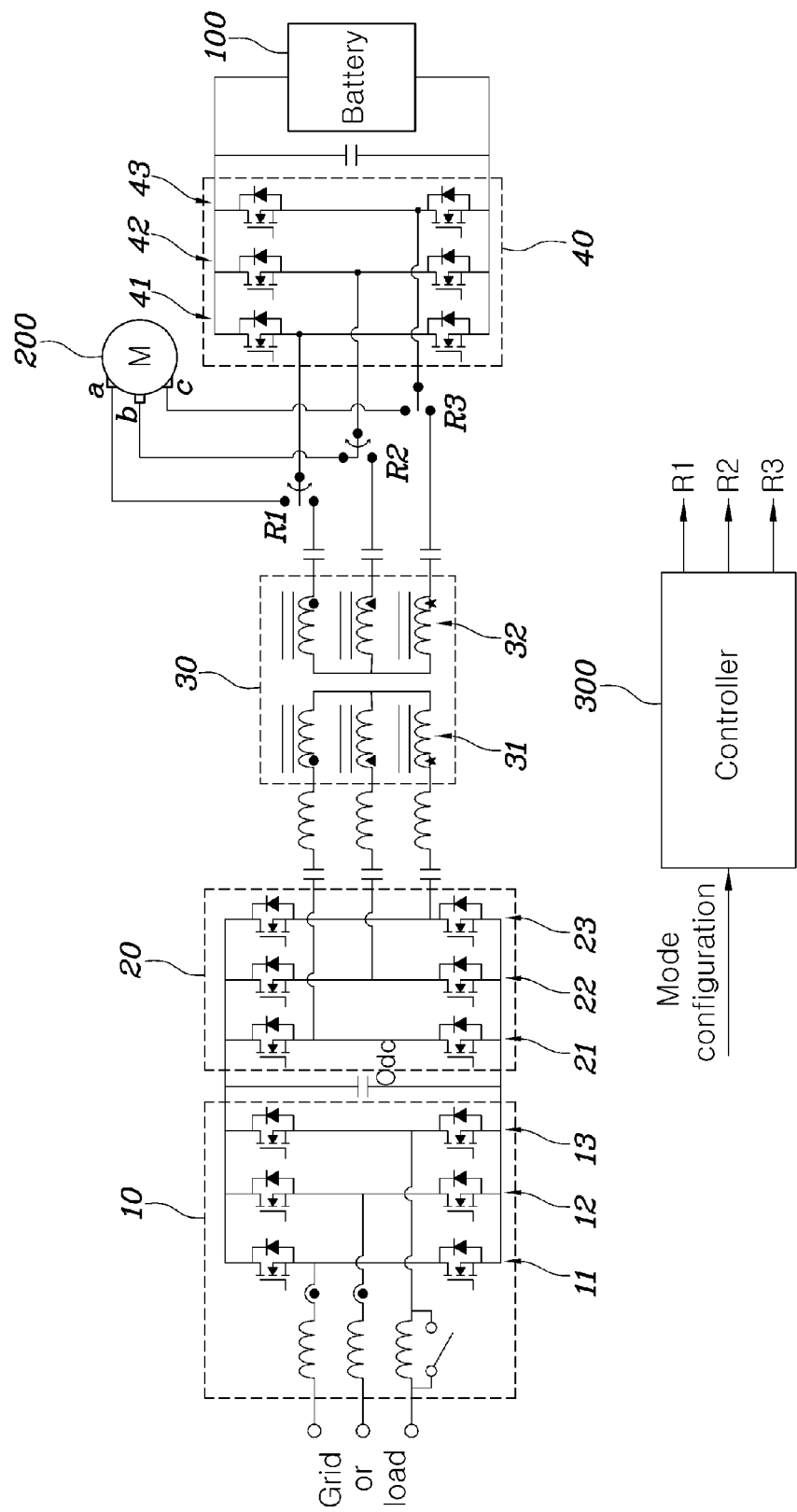
FIG. 1 is a circuit diagram illustrating a state for each operation mode of a bidirectional charging system for a vehicle according to an embodiment of the present disclosure.

FIG. 1 is a circuit diagram illustrating a state for each operation mode of a bidirectional charging system for a vehicle according to an embodiment of the present disclosure.

Referring to FIG. 1, a bidirectional charging system for a vehicle according to an embodiment of the present disclosure may include a first bridge circuit 40 having a plurality of legs 41, 42, and 43 each including two first switching elements connected in series with each other between both ends of a battery 100, a transformer 30 having a plurality of primary-side windings 31 connected to a grid or load side and a plurality of secondary-side windings 32 insulated from the plurality of primary-side windings, a motor 200 having a plurality of input terminals a, b, and c that receive a plurality of phase voltages, respectively, a plurality of changeover switches R1, R2, and R3 that selectively connect connection nodes of the two first switching elements included in the plurality of legs 41, 42, and 43 to the plurality of secondary-side windings 32 or to the plurality of input terminals a, b, and c, respectively, and a controller 300 that controls connection states of a plurality of relays R1, R2, and R3 according to a pre-configured operation mode.

In general, a bidirectional charger is a charger having a direct current-direct current (DC-DC) converter capable of performing bidirectional powering, and may include a power factor correction (PFC) circuit that receives alternating current (AC) power for charging a battery from a grid so as to compensate a power factor and form a DC voltage, and a bidirectional DC-DC converter that converts the magnitude of the DC voltage output from the power factor correction circuit into the magnitude which enables battery charging. For a V2G or V2L operation of supplying power from the battery, the bidirectional DC-DC converter appropriately converts the magnitude of the voltage of the battery and the power factor correction circuit operates as an inverter, so that AC power can be provided to an external grid or load.

The bidirectional charging system according to various embodiments of the present disclosure may also include a power factor correction circuit 10 and a bidirectional DC-DC converter. In FIG. 1, the bidirectional DC-DC converter may include two bridge circuits 20 and 40 for bidirectional conversion of DC-AC, and the transformer 30 for insulation.

The power factor correction circuit 10 may be implemented by an inductor and switching elements. The power factor correction circuit 10 shown in FIG. 1 is shown as a circuit configuration for selectively responding to a single-phase and three-phase AC input.

More specifically, the power factor correction circuit 10 may include a plurality of inductors each having a first end connected to a grid/load connection terminal to which a grid or load of each phase is connected, and a plurality of switching elements configuring a bridge circuit. A second end of one inductor may be connected to a connection node of two switching elements configuring one leg 11, 12, or 13 of the bridge circuit. Both ends of each of the legs 11, 12, and 13 of the power factor correction circuit 10 may be connected to both ends of a capacitor Cdc for forming a DC voltage.

By the connection relation, the connection relation between a switching circuit and an inductor corresponding to each phase forms a boost converter topology applied to the conventional power factor correction circuit.

Among the bridge circuits configuring the bidirectional DC-DC converter, a second bridge circuit 20 directly connected to the grid or load side, that is, to the power factor correction circuit 10 may include a plurality of legs 21, 22, and 23 connected in parallel to each other to the both ends of the capacitor Cdc, and each of the legs 21, 22, and 23 may include two switching elements connected in series with each other.

A plurality of windings 31 provided on a primary side of the transformer 30 may be connected to connection nodes of the switching elements included in the legs 21, 22, and 23, respectively.

In an embodiment of the present disclosure, the bridge circuit 20 connected to the primary-side windings 31 of the transformer 30 of the bidirectional DC-DC converter may be configured to have three legs and implemented to generate AC voltages having three different phases.

Accordingly, in the bidirectional DC-DC converter, the bridge circuit 40 connected to the secondary-side windings 32 of the transformer 30 may also be configured to have three legs 41, 42, and 43 each including two switching elements.

The switching states of the switching elements included in the first bridge circuit 40 and the second bridge circuit 20 may be controlled by pulse width modulation control, and the switching elements may perform bidirectional AC-DC conversion for converting AC to DC in one direction and converting DC to AC in the other direction.

For example, in a case of providing the power input from a grid to the battery 100 so as to charge the battery wo, the switching elements included in the second bridge circuit 20 perform DC-AC conversion for converting a DC voltage applied to a DC capacitor Cdc into an AC voltage, and the switching elements included in the first bridge circuit 40 perform AC-DC conversion for converting an AC voltage provided from the secondary-side windings 32 of the transformer 30 into a DC voltage capable of charging the battery.

In addition, in a case of converting DC power of the battery wo into AC power so as to provide the converted AC power to a grid or an AC load, the switching elements included in the first bridge circuit 40 perform DC-AC conversion for converting a DC voltage of the battery wo into an AC voltage, and the switching elements included in the second bridge circuit 20 perform AC-DC conversion such that an AC voltage provided from the primary-side windings 31 of the transformer 30 is converted into a DC voltage and the converted DC voltage is provided to the DC capacitor Cdc.

In order for power transmission between the bridge circuits 20 and 40 each having at least three legs, the transformer 30 may be implemented as a polyphase transformer having a form in which at least three primary-side windings 31 and at least three secondary-side windings 32 are configured so as to form electromagnetic induction with each other. The primary-side windings 31 or the secondary-side windings 32 may form a Y-connection or a Δ-connection.

The DC-DC converter shown in FIG. 1 shows an example of an LLC converter in which a resonance circuit including a capacitor and an inductor is added to the primary side of the transformer 30. However, the present disclosure is not limited to the LLC converter structure shown in FIG. 1, and as such a phase shift converter structure that does not have a resonance circuit or a CLLC converter structure in which a resonance circuit including a capacitor and an inductor is added also to the secondary side of the transformer 30, various known converter topologies having a bridge circuit capable of forming insulation through a transformer and generating phase voltages having a plurality of phases through switching of a switching element may be applied to the present disclosure.

The battery 100 is an element that stores electric energy so as to provide DC power having a high voltage to a vehicle driving motor in an eco-friendly vehicle driven by electric energy, such as an electric vehicle. The battery 100 may be charged by receiving a charging power provided through the power factor correction circuit 10 and the DC-DC converter as described above.

In addition, the DC power stored in the battery 100 may be converted into AC power by the power factor correction circuit 10 and the DC-DC converter, and may be provided to the grid or the AC load. That is, the battery 100 may be a power supply source that supplies power to a grid or a load through a charging circuit capable of performing bidirectional powering.

In an embodiment of the present disclosure, the motor 200 may be an auxiliary driving motor installed in each driving wheel for torque vectoring. The motor 200 may be another motor which is provided in a vehicle and can be operated by a high voltage. The motor 200 may have input terminals a, b, and c to which a phase voltage and a phase current are input, and may be selectively connected to the first bridge circuit 40 according to the operation of the changeover switches R1, R2, and R3. More specifically, the input terminals a, b, and c of the motor may be selectively connected to the connection nodes of the two switching elements included in respective legs of the first bridge circuit 40, respectively, according to the operation of the changeover switches R1, R2, and R3.

The changeover switches R1-R3 may be operated under the control of the controller 300 according to a driving mode, and the secondary-side windings 32 of the transformer 30 or the input terminals a, b, and c of the motor 200 may be connected to the connection nodes of the two switching elements included in respective legs of the first bridge circuit 40.

In FIG. 1, the changeover switches R1-R3 are shown in the form of three 2-way switches, but the present disclosure is not limited thereto, and various types and various numbers of switching means capable of selectively connecting the connection nodes of the two switching elements included in respective legs of the first bridge circuit 40 to the input terminals a, b, and c of the motor or to the secondary-side windings 32 of the transformer 30 may be employed.

Accordingly, a case in which there is no changeover switch R1-R3 as a switching means of a type different from that of FIG. 1 may also be assumed. In this case, referring to FIG. 2, when it is determined that a vehicle is traveling (S11) and it is determined that the vehicle is traveling in a high-performance mode requiring torque vectoring (S12), the controller 300 may control the first bridge circuit 40 as another type of switching means, and thus enable the connection nodes of the switching elements included in respective legs of the first bridge circuit 40 to be electrically connected to the input terminals a, b, and c of the motor 200 (S13). In this case, it will have to be controlled so that power is not transmitted through the transformer of the converter. Similarly, when it is determined that a vehicle is traveling (S11) and it is not determined that the vehicle is traveling in a high-performance mode requiring torque vectoring (S12), the controller may control the first bridge circuit 40 to perform a V2L control, and in this case, the motor will not be driven.

The controller 300 may receive an input of an operation mode determined by an upper controller by a driving state of a vehicle and an input of a driver, and control states of the relays R1-R3 according to the received operation mode. In addition, the controller 300 may appropriately control a switching element included in each component so as to correspond to each operation mode, and thus enable powering corresponding to each operation mode to be performed.

The operation of various modes performed by the controller 300 and the effect resulting therefrom may be more clearly understood through the description of a control method of a bidirectional charging system for a vehicle according to an embodiment of the present disclosure to be described later.

Figure 2:
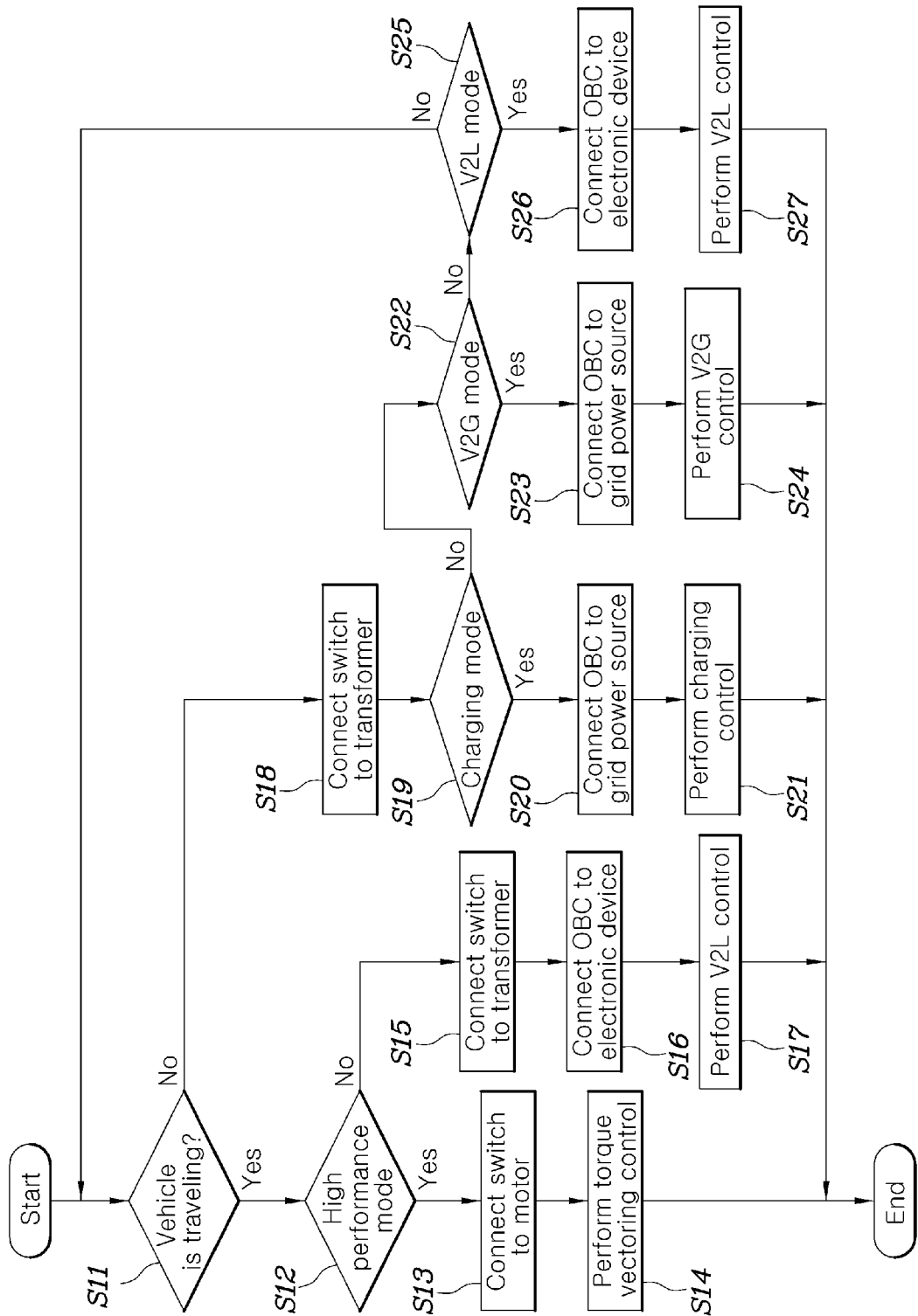
FIG. 2 is a flowchart illustrating a control method of a bidirectional charging system for a vehicle according to an embodiment of the present disclosure.

FIG. 2 is a flowchart illustrating a control method of a bidirectional charging system for a vehicle according to an embodiment of the present disclosure.

Referring to FIG. 2, a control method of a bidirectional charging system according to an embodiment of the present disclosure may be achieved by controlling, by a controller 300, respective circuits configuring a charging system and relays R1, R2, and R3, according to determination of whether a vehicle is traveling (S11), determination of whether high-performance driving is required when the vehicle is traveling (S12), determination of whether a battery is being charged when the vehicle is not traveling (S19), and determination of whether to execute a vehicle to grid (V2G) or vehicle to load (V2L) mode when the vehicle is not traveling and the battery is not being charged (S22 and S25).

The determination of each operation mode described above may be made by an upper controller and the result of the determination may be provided to the controller 300, and the controller 300 itself may directly determine an operation mode by receiving information on whether the vehicle is traveling and the battery is being charged.

Hereinafter, an example of a control operation performed by the controller 300 according to various modes determined according to whether a vehicle is traveling and a charging V2G or V2L is executed is described.

High Performance Mode while Traveling

When it is determined that a vehicle is traveling (S11) and it is determined that the vehicle is traveling in a high-performance mode requiring torque vectoring (S12), the controller 300 may control the changeover switches R1, R2, and R3 to enable the connection nodes of the switching elements included in respective legs of the first bridge circuit 40 to be electrically connected to the input terminals a, b, and c of the motor 200 (S13).

Subsequently, the controller 300 may control the switching elements in the first bridge circuit 40 such that the first bridge circuit 40 operates as an inverter that converts a DC voltage of the battery 100 into AC voltages having a plurality of phases, so as to enable the motor 200 to be driven (S14).

The controller 300 may receive a torque command corresponding to the magnitude of the torque required by the motor 200 for torque vectoring from an upper controller, etc., calculate a current actually provided to the motor 200 on the basis of a detected phase current value provided to the motor 200 and a position sensing value of a rotor in the motor 200, and perform pulse width modulation control of the switching elements in the first bridge circuit 40 on the basis of a result of comparing the magnitude of the calculated current actually provided to the motor 200 and the magnitude of a current command corresponding to the torque command, so as to control the driving of the motor 200.

Since a control technique known in the art may be applied to the control of the motor 200, a more detailed description of a motor control technique will be omitted.

Normal Mode while Traveling

When it is determined that a vehicle is traveling (S11) and it is determined that the vehicle is traveling in a normal driving mode not a high-performance mode requiring torque vectoring (S12), the controller 300 may control the changeover switches R1, R2, and R3 to enable the connection nodes of the switching elements included in respective legs of the first bridge circuit 40 to be electrically connected to the secondary-side windings 32 of the transformer 30 (S15).

Subsequently, when an electronic device (load) is connected to an AC/load input terminal of the charging system (S16), the controller 300 may control the switching elements in the first bridge circuit 40 such that a DC voltage of the battery 100 is converted into an AC voltage and the converted AC voltage is provided to the secondary-side windings 32 of the transformer 30. In addition, the controller 300 may control the switching elements in the second bridge circuit 20 such that AC power of the primary-side windings 31 of the transformer 30 induced by AC power applied to the secondary-side windings 32 of the transformer 30 is converted into DC power (S17).

In addition, the controller 300 may control the bridge circuit in the power factor correction circuit 10 such that a DC voltage formed in the DC capacitor Cdc through the control of the second bridge circuit 20 is converted into AC power corresponding to a load power source, and accordingly, enable power to be supplied to the load in the vehicle through a load connection port and the like disposed in the vehicle during vehicle traveling (S17). The load connection port disposed in the vehicle may be a port disposed in the vehicle and branched from an AC input terminal of the power factor correction circuit 10.

The switching elements in the bridge circuit in the power factor correction circuit 10, the second bridge circuit 20, and the first bridge circuit 40 may be pulse width modulation controlled through a known control technique known in the art.

Battery Charging Mode while Stopped

When it is determined that a vehicle is not in a traveling state (S11), the controller 300 may first control the changeover switches R1, R2, and R3 to enable the connection nodes of the switching elements included in respective legs of the first bridge circuit 40 to be electrically connected to the secondary-side windings 32 of the transformer 30 (S18).

When it is determined that the vehicle is in a battery charging mode while stopped (S19) and a grid is connected to the AC/load input terminal of the charging system (S20), each configuration circuit in the charging system may operate as a component of a typical charger.

That is, the controller 300 may appropriately control the switching elements in the power factor correction circuit 10 to enable a DC voltage having a preconfigured magnitude to be applied to the capacitor Cdc, and perform pulse width control of the switching elements in the bridge circuits 20 and 40 such that an output voltage and an output current of the DC-DC converter including the first bridge circuit 40, the transformer 30, and the second bridge circuit 20 correspond to preconfigured command values. Accordingly, a charging voltage capable of charging the battery 100 is provided to a battery-side connection terminal of the first bridge circuit 40 to enable the battery 100 to be charged (S21).

The switching element control of the power factor correction circuit 10 and the switching element control of the first bridge circuit 40 and the second bridge circuit 20 disposed in the DC-DC converter may be performed by various methods previously known in the art.

V2G/V2L Mode while Stopped

When the controller 300 determines that a V2G/V2L mode is being executed while a vehicle is stopped (S22 and S25) and a grid is connected to a load (grid) connection terminal of the charging system or a load is connected thereto (S23 and S26), the controller 300 may perform pulse width modulation control of the switching elements in the first bridge circuit 40 and the switching elements in the second bridge circuit 20 such that powering is performed from the battery 100 side toward the direction of the load connection terminal of the charging system. In addition, the controller 300 may perform pulse width modulation control of the switching elements of the bridge circuit in the power factor correction circuit 10 such that a DC voltage formed in the DC capacitor Cdc is converted into AC power corresponding to the grid or load power source (S24 and S25).

The switching element control of the bridge circuits 20 and 40 disposed in the DC-DC converter and the switching element control of the power factor correction circuit 10 applied in such reverse powering may be performed by various methods previously known in the art.

As described above, in an embodiment of the present disclosure, a motor for torque vectoring is driven using a bridge circuit of a DC-DC converter disposed in a charger, so that a separate inverter circuit for an auxiliary driving motor may be omitted. Accordingly, it is possible to suppress an increase in circuit size and an increase in cost due to the addition of a motor driving circuit.

Although the specific embodiments of the present disclosure have been illustrated and described above, it will be apparent to a person skilled in the art that the present disclosure may be variously improved and modified within the scope of the claims.

What is claimed is:

1. A bidirectional charging system for a vehicle, the system comprising:
   a first bridge circuit having a plurality of legs each comprising two first switching elements connected in series with each other between ends of a battery;
   a transformer comprising a plurality of primary-side windings to be connected to a grid or load side and a plurality of secondary-side windings insulated from the plurality of primary-side windings;
   a motor comprising a plurality of input terminals configured to receive a plurality of phase voltages, respectively;
   a plurality of changeover switches configured to selectively connect connection nodes of the two first switching elements included in the plurality of legs to the plurality of secondary-side windings or to the plurality of input terminals, respectively; and
   a controller configured to control connection states of the plurality of changeover switches according to a preconfigured operation mode, wherein, in a first operation mode in which the motor is driven while the vehicle is traveling, the controller is configured to control the plurality of changeover switches such that the connection nodes of the first switching elements included in respective legs of the first bridge circuit are electrically connected to the input terminals of the motor.

2. The system of claim 1, wherein, in the first operation mode, the controller is configured to control the first switching elements such that the first bridge circuit operates as an inverter configured to convert a DC voltage of the battery to generate an AC phase voltage provided to the input terminals of the motor.

3. The system of claim 1, wherein the motor is an auxiliary driving motor installed on each driving wheel of the vehicle for torque vectoring.

4. The system of claim 1, wherein, in a second operation mode in which the motor is not driven while the vehicle is traveling, the controller is configured to control the plurality of changeover switches such that the connection nodes of the first switching elements included in respective legs of the first bridge circuit are electrically connected to the secondary-side windings of the transformer.

5. The system of claim 4, wherein, in the second operation mode, the controller is configured to control the first switching elements such that a DC voltage of the battery is converted into an AC voltage and the AC voltage is provided to the secondary-side windings of the transformer.

6. The system of claim 1, wherein, in a third operation mode in which the battery is charged while the vehicle is stopped and in a fourth operation mode in which power is supplied from the battery to an external grid or load while the vehicle is stopped, the controller is configured to control the plurality of changeover switches such that the connection nodes of the first switching elements included in respective legs of the first bridge circuit are electrically connected to the secondary-side windings of the transformer.

7. The system of claim 6, wherein, in the third operation mode and in the fourth operation mode, the controller is configured to control the first switching elements such that a DC voltage of the battery is converted into an AC voltage and the AC voltage is provided to the secondary-side windings of the transformer.

8. A bidirectional charging system for a vehicle, the system comprising:
   a DC-DC converter comprising:
      a first bridge circuit having a plurality of legs each comprising two first switching elements connected in series with each other between both ends of a battery;
      a transformer comprising a plurality of primary-side windings and a plurality of secondary-side windings insulated from the plurality of primary-side windings; and
      a second bridge circuit having a plurality of legs each comprising two second switching elements connected in series with each other;
   a motor comprising a plurality of input terminals configured to receive a plurality of phase voltages, respectively;
   a plurality of changeover switches configured to selectively connect connection nodes of the two first switching elements included in the plurality of legs in the first bridge circuit to the plurality of secondary-side windings or to the plurality of input terminals, respectively;
   a power factor correction circuit comprising a plurality of inductors each having a first end to a connected to a grid/load connection terminal, and a third bridge circuit having a plurality of legs each comprising two third switching elements connected in series with each other, second ends of the plurality of inductors being connected to connection nodes of the two third switching elements included in the plurality of legs in the third bridge circuit, respectively;
   a DC capacitor commonly connected between both ends of the legs in the second bridge circuit and both ends of the legs in the third bridge circuit; and
   a controller configured to control connection states of the plurality of changeover switches according to a preconfigured operation mode.

9. The system of claim 8, wherein, in a first operation mode in which the motor is driven while the vehicle is traveling, the controller is configured to control the plurality of changeover switches such that the connection nodes of the first switching elements included in respective legs of the first bridge circuit are electrically connected to the input terminals of the motor.

10. The system of claim 9, wherein, in the first operation mode, the controller is configured to control the first switching elements such that the first bridge circuit operates as an inverter configured to convert a DC voltage of the battery to generate an AC phase voltage provided to the input terminals of the motor.

11. The system of claim 9, wherein the motor is an auxiliary driving motor installed on each driving wheel of the vehicle for torque vectoring.

12. The system of claim 8, wherein, in a second operation mode in which the motor is not driven while the vehicle is traveling, the controller is configured to control the plurality of changeover switches such that the connection nodes of the first switching elements included in respective legs of the first bridge circuit are electrically connected to the secondary-side windings of the transformer.

13. The system of claim 12, wherein, in the second operation mode, the controller is configured to:
   control the first switching elements such that a DC voltage of the battery is converted into an AC voltage and the AC voltage is provided to the secondary-side windings of the transformer;
   control the second switching elements such that AC power of the primary-side windings of the transformer induced by AC power applied to the secondary-side windings of the transformer is converted into DC power; and
   control the third switching elements such that a DC voltage formed in the DC capacitor through the control of the second switching elements is converted into AC power corresponding to a power source of a load connected to the grid/load connection terminal.

14. The system of claim 8, wherein, in a third operation mode in which the battery is charged while the vehicle is stopped and in a fourth operation mode in which power is supplied from the battery to an external grid or load while the vehicle is stopped, the controller is configured to control the plurality of changeover switches such that the connection nodes of the first switching elements included in respective legs of the first bridge circuit are electrically connected to the secondary-side windings of the transformer.

15. The system of claim 14, wherein, in the third operation mode and in the fourth operation mode, the controller is configured to:
   control the first switching elements such that a DC voltage of the battery is converted into an AC voltage and the AC voltage is provided to the secondary-side windings of the transformer;
   control the second switching elements such that AC power of the primary-side windings of the transformer induced by AC power applied to the secondary-side windings of the transformer is converted into DC power; and
   control the third switching elements such that a DC voltage formed in the DC capacitor through the control of the second switching elements is converted into AC power corresponding to a power source of a grid or a load connected to the grid/load connection terminal.

16. A method of controlling a vehicle comprising a bidirectional charging system comprising a first bridge circuit having a plurality of legs each comprising two first switching elements connected in series with each other between both ends of a battery, a transformer comprising a plurality of primary-side windings connected to a grid or load side and a plurality of secondary-side windings insulated from the plurality of primary-side windings, a motor comprising a plurality of input terminals configured to receive a plurality of phase voltages, respectively, a plurality of changeover switches configured to selectively connect connection nodes of the two first switching elements included in the plurality of legs to the plurality of secondary-side windings or to the plurality of input terminals, respectively, and a controller configured to control connection states of the plurality of changeover switches according to a pre-configured operation mode, the method comprising:

in a first operation mode in which the motor is driven while the vehicle is traveling, controlling the plurality of changeover switches such that the connection nodes of the first switching elements included in respective legs of the first bridge circuit are electrically connected to the input terminals of the motor;

in a second operation mode in which the motor is not driven while the vehicle is traveling, controlling the plurality of changeover switches such that the connection nodes of the first switching elements included in respective legs of the first bridge circuit are electrically connected to the secondary-side windings of the transformer; and in a third operation mode in which the battery is charged while the vehicle is stopped and in a fourth operation mode in which power is supplied from the battery to an external grid or load while the vehicle is stopped, controlling the plurality of changeover switches such that the connection nodes of the first switching elements included in respective legs of the first bridge circuit are electrically connected to the secondary-side windings of the transformer.

17. The method of claim 16, further comprising, in the first operation mode, controlling the first switching elements such that the first bridge circuit operates as an inverter to convert a DC voltage of the battery to generate an AC phase voltage provided to the input terminals of the motor.

18. The method of claim 16, further comprising, in the second operation mode, controlling the first switching elements such that a DC voltage of the battery is converted into an AC voltage and the AC voltage is provided to the secondary-side windings of the transformer.

19. The method of claim 16, further comprising, in the third operation mode and in the fourth operation mode, controlling the first switching elements such that a DC voltage of the battery is converted into an AC voltage and the AC voltage is provided to the secondary-side windings of the transformer.

20. The system of claim 4, wherein, in a third operation mode in which the battery is charged while the vehicle is stopped and in a fourth operation mode in which power is supplied from the battery to an external grid or load while the vehicle is stopped, the controller is configured to control the plurality of changeover switches such that the connection nodes of the first switching elements included in respective legs of the first bridge circuit are electrically connected to the secondary-side windings of the transformer.

* * * * *